July 29, 1969 P. C. CHASSAGNE ET AL 3,457,772

AUTOMATIC CLOUD POINT DETECTOR

Filed Aug. 24, 1966 2 Sheets-Sheet 1

INVENTORS:
PIERRE C. CHASSAGNE
EMMANUEL E. NEEL
BY: Theodore E Bieber
THEIR ATTORNEY

AUTOMATIC CLOUD POINT DETECTOR

Filed Aug. 24, 1966 2 Sheets-Sheet 2

INVENTORS:
PIERRE C. CHASSAGNE
EMMANUEL E. NEEL
BY: Thomas E. Bieber
THEIR ATTORNEY United States Patent Office 3,457,772
Patented July 29, 1969

3,457,772
AUTOMATIC CLOUD POINT DETECTOR

Pierre C. Chassagne and Emmanuel E. Neel, Sotteville, France, assignors to Shell Oil Company, New York, N.Y., a corporation of Delaware Filed Aug. 24, 1966, Ser. No. 574,683
Claims priority, application France, Aug. 26, 1965, 29,564
Int. Cl. G01n *25/02*
U.S. Cl. 73—17 5 Claims

ABSTRACT OF THE DISCLOSURE

A reference liquid and a liquid whose pour point is to be measured are placed in separate cells. Each cell is placed between crossed polarized filters, a light source and a photocell. The measuring liquid is cooled and the amount of light passing through its filters increases at the pour point due to the formation of anisotropic crystals. The photocells are placed in a bridge detection circuit and any unbalance is used to control the cooling device.

The present invention relates to the determination of the cloud point of liquids and, more particularly to determining the cloudpoint of gas oils, for example kerosenes, diesel oils and fuel oils.

The cloud point of a gas oil is an important characteristic in defining certain hydrocarbon products and the measurement thereof makes it possible to control processing units in such a way that this product is obtained in a maximum yield with due regard to the relevant specifications.

In the laboratory, this measurement is normally carried out according to ASTM-method D97–57. It has also been proposed to measure this characteristic continuously, either by optical methods or by thermal methods.

Optical measurement lends itself admirably to observation of the appearance of clouding but is subject to certain interferences, especially by water. In fact if a gas oil contains traces of water, for example about 80 p.p.m., this water becomes insoluble on cooling and the gas oil is rendered extremely cloudy. On the other hand, gas oils leaving a distillation column are usually cloudy because steam is injected into the columns. In these circumstances it becomes impossible to measure the cloud point of a water-containing product. It is necessary, therefore, to have the apparatus preceded by a purifying device which may comprise filters, coalescers, dryers, etc., and which, although eliminating the water, necessarily introduces a relatively important time constant, thus rendering the utilization of the control apparatus very difficult, if not impossible.

Now the invention makes it possible to overcome these difficulties. Its object is to provide a method for determining the cloud point of a liquid, of which the said cloud point is due to the appearance of crystals having an anisotropic structure, which method consists in illuminating the suitably cooled liquid by means of polarized light in such a way that the light is extinguished in the absence of crystals, and in determining the increase in the light traversing the liquid, this increase being due to the depolarization of the incident rays of light by the appearance of anisotropic crystals.

As used herein, the term "liquid" includes pure liquids and liquids contaminated with impurities, as well as mixtures of liquids. In particular, the liquid may contain a substance which on cooling causes the formation of crystals having a substantially isotropic structure, i.e. one which does not cause appreciable depolarization of the incident light. Thus, the method according to the invention can be used for determining the cloud point of a gas oil even if this gas oil contains water. The cloud point of a gas oil is due to the appearance of paraffin wax crystals having an anisotropic structure, whereas ice crystals have a substantially isotropic structure.

A method of this type can also be used for ascertaining that at a certain temperature the cloud point of a liquid has not yet been reached. Certain specifications require that liquids, in particular distillate fractions of hydrocarbon oils, have a cloud point which is lower than a predetermined temperature. The invention makes it possible to obtain this result automatically. It is sufficient to pass a sample of the liquid to be analyzed into an enclosed space kept at the specified temperature and to ascertain that there is no increase in the amount of light analyzed such as would indicate that the cloud point of the liquid has been reached.

It is a further object of the invention to provide an apparatus for carrying out the method according to the invention in any of its embodiments. Such an apparatus comprises two cells, one a measuring cell designed to receive the liquid to be examined, the other a reference cell. Both cells are illuminated by the same light source and a polarizing filter, both the latter being arranged on one side of the cells in such a way that the incident ray can traverse the said two windows, a second filter crossed with respect to the first one and photoelectric devices positioned on the other side of the cells in such a way as to determine the intensity of the residual light passed on by the second filter. The reference cell receives the same liquid as the measuring cell, but at a temperature above the cloud point.

Such an apparatus advantageously also comprises an electronic device which opens a valve controlling the supply of liquid to be analyzed as soon as the intensity of the residual light revealed by the photoelectric device reaches a predetermined value. In this way a continuous automatic operation can be achieved.

The cooling means may comprise a circulation of a cooling liquid or elements for producing the Peltier effect.

The following description and the accompanying drawing, which is primarily provided by way of example, serve to explain how the invention may be carried into effect. Referring to the drawing.

Figures 1, 2:
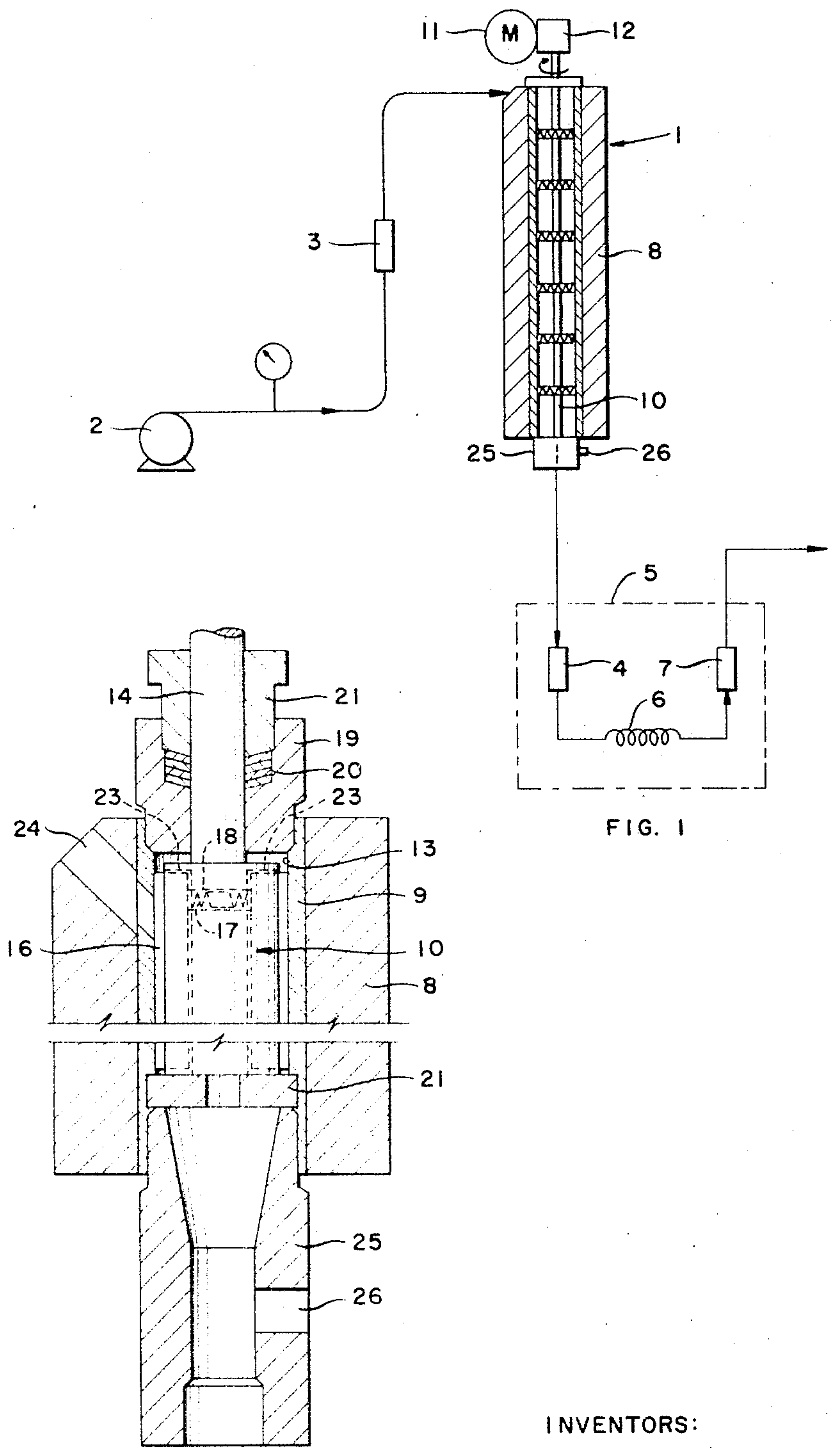
FIGURE 1 is a schematic diagram of an apparatus according to the invention.
FIGURE 2 is a vertical section of the cooling device which forms part of the diagram of FIGURE 1.

The apparatus schematically shown in FIGURE 1 makes it possible to carry out the method according to the invention, which consists in illuminating by means of polarized light the suitably cooled liquid of which it is desired to determine the cloud point, in analyzing the light traversing the liquid and in determining the increase in the light analyzed, this increase being due to the depolarization of the incident rays of light by the appearance of anisotropic crystals at the cloud point of the liquid. The latter may contain as impurities a substance, which, on cooling, causes the formation of crystals having an isotropic or very slightly anisotropic structure.

This selective role played by the polarized light in the anisotropic crystals and the isotropic crystals may be used in particular in the determination of the cloud point of a gas oil containing traces of water. The cloud point of the gas oil corresponds to the appearance of paraffin wax crystals.

By way of illustration the properties of paraffin wax crystals and ice crystals are summarized in the table below.

| Compound | Crystalline structure | Refractive indices | | Difference (2)–(1) |
|---|---|---|---|---|
| | | Ordinary $n_D^{20}$ (1) | Extra-ordinary $n_D^{10}$ (2) | |
| Ice | Hexagonal | 1.309 | 1.313 | 0.004 |
| Paraffin wax | Rhombic | 1.504 | 1.553 | 0.049 |

This table shows that the small difference between the refractive indices of ice makes it possible to look upon its crystals as being practically isotropic in relation to those of paraffin wax. Consequently, their depolarization effect is small and since the concentration of the water in the gas oil generally does not exceed 1000 p.p.m. in the case of a stable emulsion, it has been found that their effect is practically nil when the cloud point of the gas oil is determined.

Although water will be present in most cases, it will be understood that the invention is not limited to this example, which primarily serves to illustrate the invention.

As shown in FIGURE 1, an apparatus according to the invention comprises a measuring cell designated in a general manner by 4 and a reference cell 7.

The two cells are supplied with liquid to be analyzed by suitable pressure-producing means, for example a pump 2. The pump 2 discharges into a flow control means 3 that maintains a constant flow through the two cells. The flow control means discharges to a cooling device 1 that is provided with means for cooling the liquid below its cloud point. From the cooling device the liquid flows through the measuring cell 4 then through a heating coil 6 to the reference cell 7 and is discharged. The two cells form part of the optical system 5 which is described in greater detail below.

The cooling means 1 is provided with a stirring means or agitator 10 driven by means of a motor 11 through a gear reduction 12. Cooling means 1 is also provided with a temperature-measuring means 24 in order that the temperature of the liquid discharged from the cooling means may be measured.

Referring now to FIGURE 2 there is shown the detailed construction of the cooling means. The cooling device comprises an outer housing or support member 8 that is formed of a good conducting material for example aluminum. The support member 8 may be surrounded by a cooling coil or provided with radiation fins not shown in FIGURE 2. A preferred method of cooling the liquid is through the use of Peltier elements. It is, of course, necessary to provide sufficient cooling to permit cooling the liquid below its cloud point. The support means 8 is provided with a circular liner 9 also formed of a good heat-conducting material, for example aluminum. The stirrer 10 extends into the cylindrical liner 9 and utilizes a shaft 14 which rotates in an upper bushing 19. The lower end of the shaft 14 is supported by bearing member 21 that is provided with suitable openings in order that the liquid may pass through. The shaft 14 is sealed in the bushing 19 by means of packing 20 and a packing nut 21. The portion of the shaft within the cylindrical liner 9 is provided with an enlarged section 22 that contains diametrically opposite recesses 23. Flat scraper blades 16 are inserted in each of the recesses 23 with the blades being biased outwardly by means of a compression spring 17 disposed in a pocket 18 formed in the shaft member. The use of the agitator or scraper means 10 eliminates the solid deposits along the inner wall of the wall 13 of the liner 9. It is necessary to eliminate the solid deposits to obtain an accurate reading of the cloud point of the liquid.

Liquid is introduced to the cooling means through an inclined passageway 24 that extends through the support means 8 and the liner 9. The cooled liquid is discharged through a lower bearing 21 and discharge chamber 25. The discharge chamber 25 is provided with an opening 26 through which a temperature-measuring means may be inserted in the discharge chamber 25. The temperature-measuring means may take various forms, for example a conventional thermocouple which could be connected to a conventional temperature-recording means.

Figure 4:
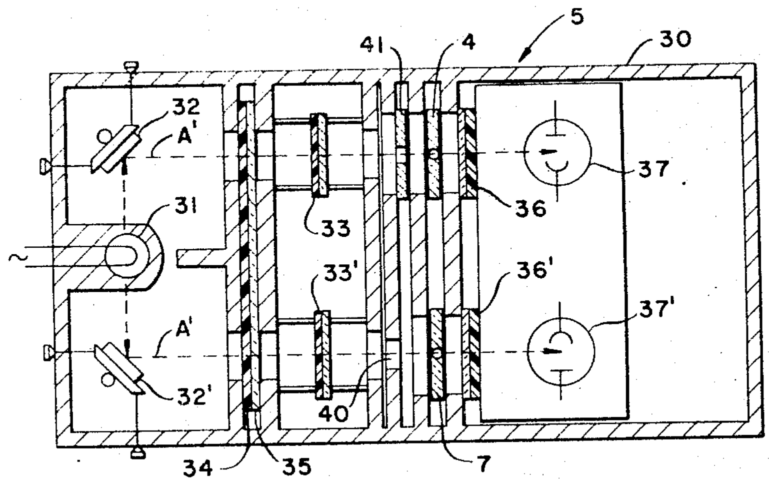
FIGURE 4 is a cross-section of the measuring and reference cells showing the optical system.

Referring now to FIGURE 4 there is shown a cross-section of the optical system 5 shown in FIGURE 1. The measuring cell 4 and the reference cell 7 are preferably formed of a transparent material for example glass. The alternate construction may consist of metallic cells that are provided with transparent windows. The measuring cell and reference cells are disposed in a supporting member 30 that in addition to supporting the cells maintains the remainder of the optical system in a fixed geometry. The optical system uses a light source 31 which conveniently may be an incandescent light. Two mirrors 32 and 32′ are disposed to reflect the light along two axes A and A′. The axis A is so arranged that the light will pass through the measuring cell 4 while the axis A′ is arranged to pass the light through the reference cell 7. The linear polarizing filters 33 and 33′ are positioned along the light axes A and A′, respectively, between the light source and the cells. The performance of the instrument can be improved by providing a red filter 34 along the light axes A and A′. The filter 34 will remove the visible component of the polarized light in the absence of a signal and thus improve the signal-to-background noise ratio. The filter 34 may be conveniently supported by means of a glass plate 35. Two additional linear polarized filters 36 and 36′ are disposed on the other side of the cells 4 and 7 crossed at right angles to the polarizing filters 33 and 33′. The light passing through the filter 36 is intercepted by photoelectric cell 37 while the light passing through the filter 36′ is intercepted by a photocell 37′. The two photocells are disposed in a measuring circuit described below.

As explained above, the cell 4 forms the measuring cell while the cell 7 forms the reference cell. Thus, it is necessary to balance the signal from the two cells under normal conditions. To accomplish this the cell 7 is provided with a fixed opening 40 along the light axis A′ while the measuring cell 4 is provided with a variable diaphragm 41 along the light axis A. Thus, by varying the size of the diaphragm 41 one can balance the two signals generated by the phootcells 37 and 37′ under normal conditions.

Figure 3:
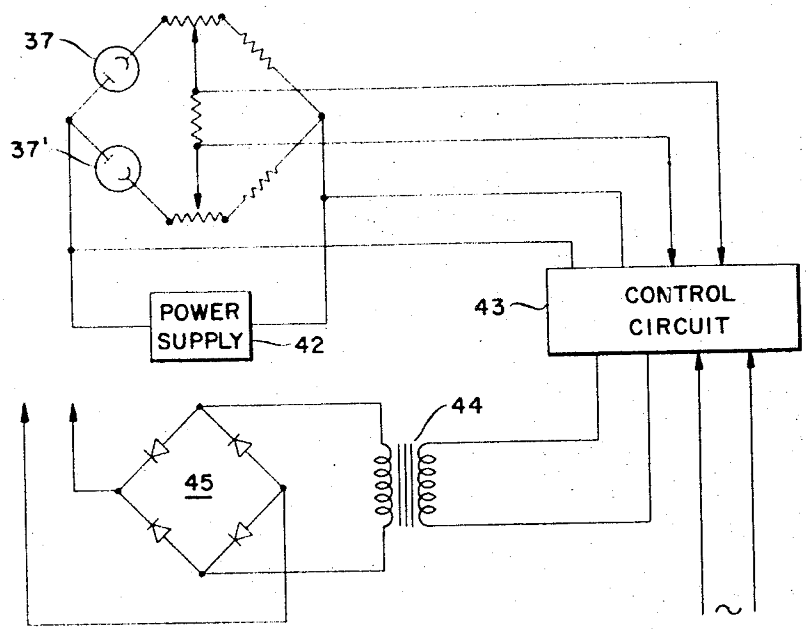
FIGURE 3 is a schematic circuit diagram of the control and measuring circuits.

Referring now to FIGURE 3, there is shown a suitable circuit for determining the cloud point of the liquid. The two photocells 37 and 37′ are disposed in two legs of a conventional bridge circuit powered from a suitable alternating power supply 42. The unbalanced signal of the bridge circuit is determined by a control circuit 43. Control circuit 43 receives a reference signal from the power supply 42 and determines the unbalance existing in the bridge. The unbalanced signal of the bridge is supplied through a transformer 44 to a rectifying bridge 45. The signal from the bridge 45 is used to control the cooling means used for cooling the liquid being analyzed. As explained above, cooling coils may be used in the supporting member 8. In this case the signal from the bridge 45 would be used to control the flow of coolant through the coils. In a similar manner signal from the bridge 45 could be used to control the flow of current through Peltier junctions that are disposed on the support member 8. In addition, the unbalanced signal can be recorded in relation to temperature in order that the exact cloud point of the material will be determined.

During the cooling the appearance of anisotropic crystals in measuring cell 4 causes the light to be depolarized without any isotropic crystals present disturbing this depolarization, in such a way that the photoelectric device 37 receives an increasing amount of light. In contrast the light striking the photoelectric device 37 will remain constant. The unbalance of the light increases with the quantity of anisotropic crystals formed. As already observed, if the liquid is rendered cloudy by water in suspension, this cloudiness will not interfere with the measurement since liquid water is not capable of effecting depolarization.

Example

Tests were carried out in accordance with the invention, using various Kuwait gas oils.

The results of these tests are presented in the following table, which shows the cloud point as defined by ASTM method D9757 and the cloud point as determined by an automatically operating apparatus according to the invention, using a cooling liquid consisting of alcohol kept at −40° C., for various water contents of the gas oil. This table also shows the time during which the gas oil circuit is open and the time of the complete cycle.

| Water content, p.p.m. by weight | Cloud point ASTM D9757, ° C. | Cloud point found, ° C. | Time during which gas oil circuit is open (in sec.) | Duration of cycle (in min.) |
|---|---|---|---|---|
| 125 | −10 | −10.0 | 16 | 3.15 |
| 253 | −10 | −10.3 | 16 | 3.15 |
| 431 | −10 | −10.2 | 16 | 3.15 |
| 1,079 | −10 | −10.4 | 16 | 3.15 |
| 119 | −14 | −14.0 | 15 | 5 |
| 168 | −14 | −14.4 | 15 | 5 |
| 375 | −14 | −14.6 | 15 | 5 |
| 679 | −14 | −14.4 | 15 | 5 |
| 1,290 | −14 | −14.6 | 15 | 5 |

These results show that the water content of the gas oil has little influence on the indications of the apparatus. For example, 1000 p.p.m. of water result in a maximum deviation of less than 1° C. which always tends to be in the nature of clearly lowering the value of the cloud point observed.

It will also be clear that the duration of the analysis depends on the cloud point. This is why in the case of a gas oil with a cloud point between −10° C. and −6° C. this duration is on an average 3 minutes, whereas in the case of a gas oil with a cloud point between −14° C. and −17° C. it is 5 minutes.

The determination of the cloud point may be carried out continuously by using the signal from the light-measuring device for controlling the degree of cooling of the liquid to be tested. Thus, the liquid to be tested may continuously pass through a cooler and the measuring cell; the signal of the photoelectric device may be used to control the temperature of the cooler and thus of the liquid under test in such a way that substantially no crystals with an anisotropic structure develop in the liquid. Thus, the temperature of the liquid is kept continuously at the cloud point temperature.

We claim as our invention:

1. An apparatus for determining the cloud point of a liquid wherein the cloud point is due to the appearance in the liquid of crystals having an anisotropic structure, said apparatus comprising:

a measuring cell and a reference cell, each of said cells being provided with a pair of transparent windows;

flow means, said flow means being disposed to supply liquid to both said measuring and reference cells;

a cooling means, said cooling means being associated with said measuring cell to cool the liquid therein;

a heating means being associated with said reference cell to maintain the temperature of the liquid therein above the cloud point of the liquid;

a light source, said light source being disposed in such a way that incident light can traverse the said windows in both said measuring and reference cells;

a pair of linear polarizing filters, one of said filters being disposed to polarize the light source entering said cells, the other of said filters being disposed in a crossed position relative to said first mentioned filter to intercept the light leaving said cells;

a photoelectric device, said photoelectric device being disposed to determine the difference in residual light passed through each cell; and a temperature-measuring means, said temperature-measuring means being disposed to measure the temperature of the liquid in the measuring cell.

2. The apparatus of claim 1 wherein the photoelectric device comprises two separate elements positioned to separately measure the residual light passed by the cells, said separate elements being coupled to a circuit means to measure the difference in measured residual light passing through each cell.

3. The apparatus of claim 1 wherein the outlet of said measuring cell is connected to the inlet of said reference cell and said heating means is disposed between the outlet of the measuring cell and the inlet of the reference cell.

4. The apparatus of claim 2 and in addition a control means, said control means being coupled to said circuit means and said flow means to control the supply of liquid in response to the difference in measured residual light.

5. The apparatus of claim 1 wherein said cooling means comprises Peltier elements, a control means, said control means being coupled to said Peltier elements and responsive to the photoelectric device.

References Cited

UNITED STATES PATENTS

| | | | |
|---|---|---|---|
| 3,008,324 | 11/1961 | Rayford et al. | 73—17 |
| 3,031,880 | 5/1962 | Findlay | 73—17 |
| 3,187,557 | 6/1965 | Holbourne | 73—17 |

JAMES J. GILL, Primary Examiner

H. GOLDSTEIN, Assistant Examiner